Patented Jan. 28, 1941

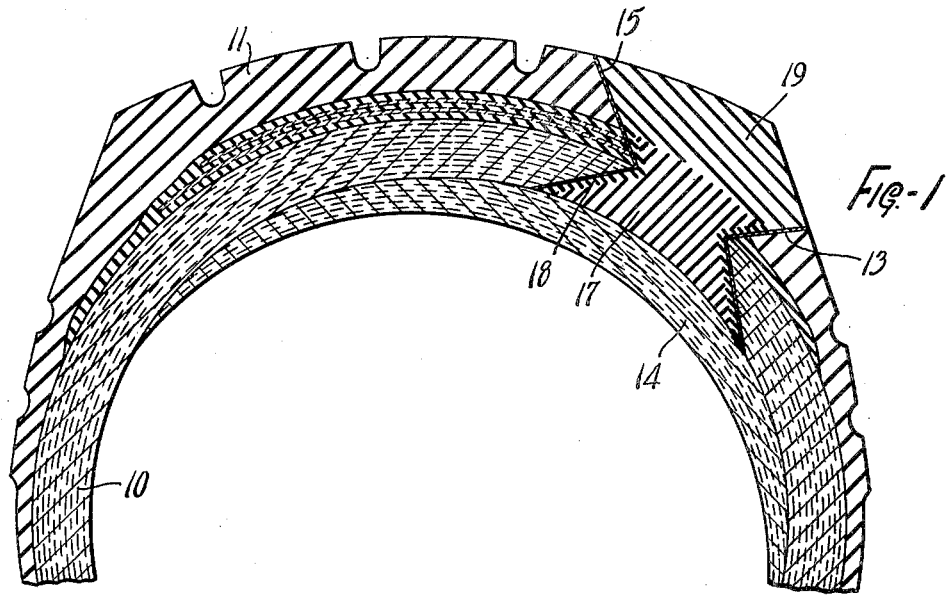
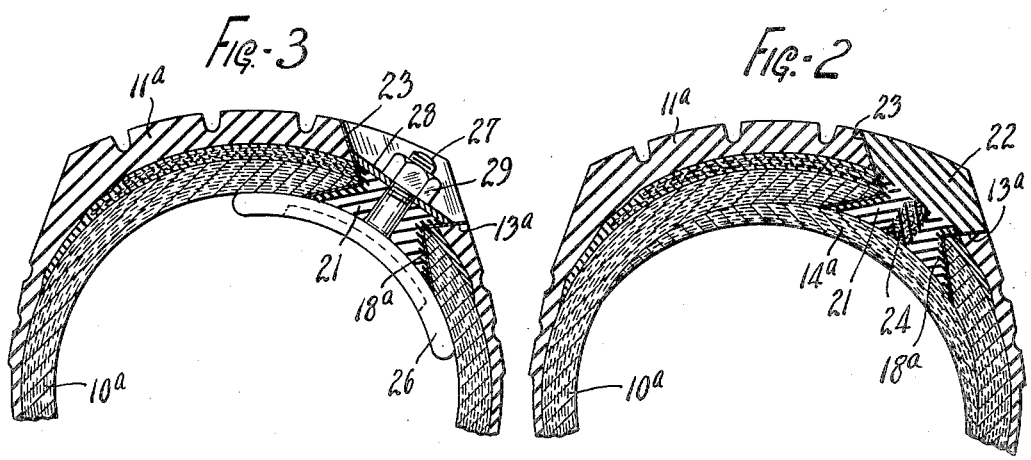

2,229,878

UNITED STATES PATENT OFFICE 2,229,878

TIRE REPAIR AND METHOD OF REPAIRING TIRES

Robert F. Wilson, Akron, Ohio, assignor to The Firestone Tire & Rubber Company, Akron, Ohio, a corporation of Ohio Application March 13, 1937, Serial No. 130,719

9 Claims. (Cl. 154—14)

This invention relates to tire repairs and to methods of repairing tires, and more especially it relates to tires having repaired blowouts therein and to procedure for effecting such repairs.

The chief object of the invention is to provide an improved tire repair. More specifically the invention aims to provide a tire repair wherein the added repair-stock will not readily separate from the surrounding structure. Further objects are to prevent localized flexing of the repair stock adjacent its region of union with the surrounding structure; and to provide an improved method of making repairs of the character mentioned. Other objects will be manifest as the specification proceeds.

Of the accompanying drawing:

Figure 1 is a fragmentary sectional view of a repaired tire constituting one embodiment of the invention;

Figure 2 is a fragmentary sectional view, on a smaller scale, of a repaired tire constituting another embodiment of the invention; and Figure 3 is view of the repaired tire shown in Figure 2 illustrating the method and apparatus for effecting the repair.

Referring now to Figure 1 of the drawing, there is shown a pneumatic tire casing comprising the usual rubberized fabric body plies 10 and the usual tread structure 11 of tough, abrasion resisting rubber composition. The repair is located at one margin of the tread 11, which is one of the "hinges," or regions of greatest flexure of the tire.

The tire repair is mounted in an aperture 13 in the tire wherein the blowout has taken place, said aperture being beveled or skived both from the outside of the tire and from the inside thereof, the repair being complementally shaped so as to have a restricted medial region whereby the repair is mechanically interlocked with the tire structure. The repair also comprises a multiple-ply, rubberized fabric patch 14 that constitutes an integral part of the repair, and which extends over a substantial area of the inner surface of the tire around the repair area, said patch also contributing to the mechanical interlock aforementioned. The repair is bonded to the tire structure by vulcanization through the agency of heat-resisting rubber cement, the latter being indicated at 15 in the drawing.

The repair comprises the fabric patch 14 aforementioned, a body of relatively soft cushion rubber 17 bonded thereto and disposed within the aperture 13 in the region of the fabric body plies thereof, a relatively thin layer of heavy-duty, stiff, heat-resisting rubber composition 18 disposed between the sides of the rubber body 17 and the tire structure, and a body of tough, abrasion-resisting rubber tread stock 19 overlying the cushion rubber 17 and bonded to the latter and to the tire structure, which will be the tread portion thereof. The several elements of the repair are vulcanized to each other and to the surrounding tire structure.

The arrangement is such that abrasion of the repair is resisted by the tough rubber body 19. The presence of the soft, cushion rubber 17 in the repair makes the repair readily flexible and avoids the presence of a local, relatively stiff region in the tire. The presence of the relatively stiff bonding rubber 18 between the tire structure and the cushion rubber 17 prevents flexure of the latter from localizing at regions adjacent the tire plies, with the result that there is no such separation between the cushion rubber and the tire structure, or patch 14, as occurs in other types of tire repairs.

In the repairing of the tire, the latter is prepared by skiving or bevelling the margins of the blowout aperture both on the outside surface and inside surface of the tire. A thin coating of heat-resisting rubber cement is then applied to the skived surfaces of the aperture, after which the region of the aperture within the fabric plies 10 of the tire is lined with a relatively thin layer (about $\frac{1}{16}''$ thick) of unvulcanized, heavy-duty, stiff, heat-resisting rubber composition 18. The aperture is then filled with unvulcanized, relatively soft, cushion rubber 17 that extends as far as the outermost limits of layer 18. The inner surface of the tire is then buffed about the aperture 13, and the rubberized fabric patch 14 is cemented thereto. Thereafter the body of unvulcanized tread stock 19 is mounted in the aperture 13, over the cushion rubber 17. The entire repair is then vulcanized under heat and pressure in a single operation, in the usual manner.

The construction provides a repair that is as flexible is the tire itself, that will not pull loose from the tire structure, and which achieves the other objects set out in the foregoing statement of objects.

The embodiment of the invention shown in Figure 2 consists of a pneumatic tire casing comprising the usual rubberized fabric body plies 10a and the usual tread structure 11a of tough abrasion-resisting rubber composition. The tire has been blown out at 13a, the aperture formed by said blowout being beveled from the inner and outer faces of the tire in the same manner as in the previously described embodiment. The repair comprises a rubberized fabric patch 14a adhered to the inner face of the tire, a body of soft, cushion rubber stock 21 in the bottom of the aperture 13a coincident with the fabric plies 10a of the tire, a relatively thin layer of heavy-duty, stiff, heat resisting rubber composition 18a disposed between the sides of the rubber body 21 and the tire structure, a body of tough, abrasion-resisting, rubber composition 22 overlying the cushion rubber 21 and filling the remaining portion of aperture 13a, and a thin layer of rubber cement 23 between the rubber bodies 18a, 22 and the tire structure serving as a bond therebetween. Interiorly of the body of cushion rubber 21 is a smaller body 24 of rubber composition of much greater resilience, said body preferably being of cellular sponge rubber. The presence of the sponge rubber body 24 assures that flexing and other strains of the body 21 will be localized in the sponge rubber body, with the result that tensile strains on the bond between the bonding layer 18a and the tire structure will be practically eliminated, and separation of the cushion rubber from adjacent elements avoided.

In the making of a tire repair such as that shown in Figure 2, the blowout aperture 13a of the tire is reversely skived or beveled as shown, after which the surface of the aperture is treated with a thin coating of rubber cement 23 as in the previously described practice. The layer of bonding rubber 18a is then applied to aperture 13a in the region of the fabric plies 10a, and thereafter the bottom of the aperture 13a is filled with unvulcanized cushion rubber stock 21. The latter and the bonding layer 18a are vulcanized, in situ, by means of an electrically heated device 26, the latter comprising a stem 27 that extends through the body of rubber stock 21, and a washer 28 that is forced against the outer face of said stock by means of a nut 29 threaded onto said stem. After the cushion rubber 21 is vulcanized, the vulcanizing device 26 is removed, the inner surface of the tire in the region about the repair is buffed and then cemented, and the patch 14a adhered thereto. The plug of sponge rubber 24, preferably in vulcanized condition, is then inserted into the recess in the cushion rubber body 21 from which the stem 27 previously was removed. The exposed outer face of the cushion rubber body 21 is then buffed and cemented, after which it is overlaid with unvulcanized tread stock 22 that completes the filling of the aperture 13a. Thereafter the repair is subjected to vulcanizing heat and pressure to effect vulcanization of the remaining portions of its unvulcanized structure.

The modified embodiment of the invention is substantially as durable as the first described embodiment, but the process of making is somewhat less simple.

Other modification may be resorted to without departing from the spirit of the invention or the scope of the appended claims.

What is claimed is:

1. A tire repair consisting of a rubber plug adapted to be mounted in an aperture in the wall of a pneumatic tire casing, said plug comprising a portion that is composed of relatively soft cushion rubber, and a relatively thin layer of stiff, heat-resisting, heavy duty rubber composition surrounding the periphery of said plug and adapted to be disposed between the cushion rubber and the adjacent tire structure and to be vulcanized to each of them.

2. A tire repair consisting of a filler plug entirely of rubber adapted to be mounted in an aperture through the fabric plies and the tread of a pneumatic tire casing, said plug comprising a body of tough, abrasion resisting tread stock disposed in the region of the tire tread, a body of relatively soft cushion rubber disposed therebeneath in the region of the fabric plies of the tire, and a relatively thin layer of stiff, heavy duty rubber surrounding the entire periphery of said plug and disposed between said plug and the inner surface of said aperture, said rubber bodies being bonded to each other and to the tire structure by vulcanization.

3. A tire repair consisting of a filler plug entirely of rubber adapted to be mounted in an aperture through the fabric plies and the tread of a pneumatic tire casing, said aperture being beveled from the outer and from the inner surface of the tire, said plug comprising a body of relatively soft cushion rubber that is adapted to be flush with the inner surface of the tire and extends outwardly therefrom past the region where the aperture is of smallest diameter, a relatively thin layer of stiff heavy duty rubber surrounding the entire periphery of said plug and adapted to be disposed between said plug and the adjacent wall of the aperture, and a body of tough, abrasion-resisting tread rubber overlying said cushion rubber, to be disposed in the region of the tread portion of the tire, said rubber bodies being vulcanized to each other and adapted to be vulcanized to the tire structure.

4. A tire repair consisting of a filler plug entirely of rubber adapted to be mounted in an aperture that extends through the fabric plies and tread of a pneumatic tire casing, and adapted to be bonded thereto, said plug comprising a body of soft cushion rubber positioned in the region of the fabric plies of the tire, a body of tough, tread rubber positioned in the tread region of the tire, a relatively thin layer of stiff rubber surrounding the periphery of said plug and disposed between the latter and the walls of said aperture, and a local body of cellular rubber disposed interiorly of the cushion rubber body.

5. A combination as defined in claim 4 including a patch of rubberized fabric adapted to be disposed on the inner surface of the tire casing underlying said plug, said patch being adapted to be bonded to said tire casing and plug.

6. The method of repairing a pneumatic tire casing having a puncture or blowout aperture therein which comprises skiving or beveling said aperture from the inside and outside of the casing, applying a lining of rubber composition to the wall of said aperture in the region of the fabric plies of the casing, mounting a body of relatively soft and deformable rubber composition in the lined region of said aperture, filling the remaining portion of the aperture with a body of tough tread stock, and thereafter subjecting the repair to vulcanizing heat and pressure.

7. The method of repairing a pneumatic tire casing having a puncture or blowout aperture therein which comprises lining the aperture wall in the region of the tread plies of the casing with rubber composition, integrally bonding said rubber composition to said aperture wall by vulcanization, placing a body of cellular rubber in said lined portion of the aperture, filling the outer portion of the aperture with unvulcanized tread rubber, and thereafter subjecting the entire repair to pressure and vulcanizing heat.

8. A repaired pneumatic tire including a carcass having a repair therein, said repair comprising a main body of rubber of relatively high resiliency filling an opening in said carcass and an outer layer of relative stiff rubber surrounding the periphery of said repair and interposed between said carcass and the main body of said repair and bonding said main body to the wall of said opening in said casing whereby the flexing strains are localized in said relatively highly resilient main body remote from the bond between said body and said tire casing.

9. A repaired pneumatic tire including a carcass having a repair therein, said repair comprising a main body of rubber of relatively high resiliency filling an opening in said carcass and an outer layer of relative stiff rubber surrounding the periphery of said repair and interposed between said carcass and the main body of said repair and bonding said main body to the wall of said opening in said casing whereby the flexing strains are localized in said relatively highly resilient main body remote from the bond between said body and said tire casing, and a fabric liner patch on the inside of said repair and bonded to the latter.

ROBERT F. WILSON.